(12) United States Patent
Jan et al.

(10) Patent No.: US 12,188,660 B2
(45) Date of Patent: *Jan. 7, 2025

(54) FIRE PIT SYSTEM

(71) Applicant: SOLO BRANDS, LLC, Grapevine, TX (US)

(72) Inventors: Jeffrey H. Jan, Keller, TX (US); Spencer H. Jan, Keller, TX (US)

(73) Assignee: SOLO BRANDS, LLC, Grapevine, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/585,756

(22) Filed: Feb. 23, 2024

(65) Prior Publication Data

US 2024/0191877 A1 Jun. 13, 2024

Related U.S. Application Data

(63) Continuation of application No. 18/325,627, filed on May 30, 2023, which is a continuation of application No. 17/936,928, filed on Sep. 30, 2022, now Pat. No. 11,703,227, which is a continuation of application No. 17/684,912, filed on Mar. 2, 2022, now Pat. No. 11,692,713, which is a continuation of application No. 16/722,663, filed on Dec. 20, 2019, now Pat. No. 11,293,642.

(Continued)

(51) Int. Cl.
*F24B 1/195* (2006.01)
*F24B 1/181* (2006.01)
*A47J 33/00* (2006.01)

(52) U.S. Cl.
CPC .............. *F24B 1/195* (2013.01); *F24B 1/181* (2013.01); *A47J 33/00* (2013.01)

(58) Field of Classification Search
CPC . F24B 1/195; F24B 1/181; F24B 1/182; A47J 33/00
See application file for complete search history.

(56) References Cited

U.S. PATENT DOCUMENTS

| 113,231 A | 11/1872 | Lapaire et al. |
|---|---|---|
| 685,194 A | 10/1901 | Young |

(Continued)

FOREIGN PATENT DOCUMENTS

| CN | 2035756 U | 4/1989 |
|---|---|---|
| CN | 201715561 U | 1/2011 |

(Continued)

OTHER PUBLICATIONS

Amazon.com: COOZOOM 19 Inch Large Smokeless Fire Pit with Stand Portable Stainless Steel Bonfire Stove Outdoor Wood Burning Firepit for Camping Outside with Carry Bag; retrieved online on Dec. 16, 2022; 8 pages.

(Continued)

*Primary Examiner* — Alfred Basichas
(74) *Attorney, Agent, or Firm* — Haynes and Boone, LLP; Zachary A. Halbur; Dustin Johnson

(57) ABSTRACT

The present fire pit system includes a fire pit stand including a plurality of openings, wherein a fire pit body can rest upon the fire pit stand. The fire pit stand protects below surfaces (e.g., floor, ground, etc.) from high heat. The openings in the fire pit stand increase airflow.

29 Claims, 3 Drawing Sheets

Related U.S. Application Data

(60) Provisional application No. 62/784,961, filed on Dec. 26, 2018.

(56) References Cited

U.S. PATENT DOCUMENTS

| | | | |
|---|---|---|---|
| 904,188 A | 11/1908 | Engle | |
| 936,482 A | 10/1909 | Seeley | |
| 1,298,762 A | 4/1919 | Milligan | |
| D54,930 S | 4/1920 | Knapp | |
| D74,996 S | 4/1928 | Wolcott | |
| 1,694,175 A | 12/1928 | Hauser | |
| D100,012 S | 6/1936 | Ford | |
| 2,614,553 A | 10/1952 | Cox et al. | |
| 2,722,883 A | 11/1955 | Rignell | |
| 2,738,225 A | 3/1956 | Meek | |
| D196,018 S | 8/1963 | Palmer et al. | |
| RE26,123 E | 12/1966 | Davis | |
| 3,756,218 A | 9/1973 | Simpson | |
| 3,765,397 A | 10/1973 | Henderson | |
| D229,013 S | 11/1973 | Storandt | |
| D229,277 S | 11/1973 | Chan | |
| 3,790,081 A | 2/1974 | Thornton et al. | |
| 3,937,138 A | 2/1976 | Tidwell | |
| 3,951,082 A | 4/1976 | Leggett et al. | |
| D258,259 S | 2/1981 | Lindholm | |
| D258,712 S | 3/1981 | Jacobson | |
| D273,264 S | 4/1984 | Elliston | |
| 4,572,724 A | 2/1986 | Rosenberg et al. | |
| 4,735,135 A | 4/1988 | Walker | |
| 4,903,683 A | 2/1990 | Larsen et al. | |
| 4,909,235 A * | 3/1990 | Boetcker | A47J 37/0704 126/25 C |
| 5,024,208 A | 6/1991 | Hottenroth et al. | |
| 5,117,558 A | 6/1992 | Hull | |
| D355,809 S | 2/1995 | Kothrade | |
| D358,204 S | 5/1995 | Ferrier | |
| 5,490,452 A | 2/1996 | Schlosser et al. | |
| D379,900 S | 6/1997 | Gillam et al. | |
| 5,638,808 A | 6/1997 | Home | |
| 5,651,356 A | 7/1997 | Kaines | |
| 5,687,704 A | 11/1997 | Lerch et al. | |
| 5,797,386 A | 8/1998 | Orr | |
| 5,809,988 A | 9/1998 | Wagner | |
| 5,842,463 A | 12/1998 | Hall | |
| 5,915,371 A | 6/1999 | Hering | |
| 6,024,081 A | 2/2000 | Libertini, Jr. | |
| D422,452 S | 4/2000 | Persson | |
| D426,686 S | 6/2000 | Clausen et al. | |
| D435,191 S | 12/2000 | Cooper | |
| 6,196,121 B1 | 3/2001 | Crowl | |
| 6,196,215 B1 | 3/2001 | Chandaria | |
| D442,422 S | 5/2001 | Dabney | |
| D444,991 S | 7/2001 | Measom | |
| 6,314,955 B1 | 11/2001 | Boetcker | |
| 6,393,717 B1 | 5/2002 | Santos et al. | |
| 6,488,023 B2 | 12/2002 | Pecoskie | |
| 6,532,950 B2 | 3/2003 | Meurer | |
| 6,609,514 B1 | 8/2003 | Bertolas | |
| 6,615,821 B1 * | 9/2003 | Fisenko | A47J 37/0704 126/77 |
| D488,023 S | 4/2004 | Siegel et al. | |
| D491,409 S | 6/2004 | Siegel et al. | |
| D495,552 S | 9/2004 | Siegel et al. | |
| 6,962,148 B1 | 11/2005 | Ashbaugh | |
| D531,849 S | 11/2006 | Turner | |
| D534,756 S | 1/2007 | Jensen | |
| D607,265 S | 1/2010 | Gaunaurd, III | |
| D612,191 S | 3/2010 | Taber et al. | |
| D612,662 S | 3/2010 | Lorenz et al. | |
| D618,038 S | 6/2010 | Davies et al. | |
| 7,810,484 B2 | 10/2010 | Schlosser et al. | |
| D644,474 S | 9/2011 | Wilgus et al. | |
| D652,591 S | 1/2012 | Kim | |
| 8,087,410 B2 | 1/2012 | Gregory | |
| D658,426 S | 5/2012 | Saunders | |
| 8,272,601 B2 | 9/2012 | Kocher | |
| D683,999 S | 6/2013 | Karlsson | |
| 8,668,949 B2 | 3/2014 | Wilson et al. | |
| D701,721 S | 4/2014 | Jan | |
| D722,212 S | 2/2015 | Kim et al. | |
| D722,733 S | 2/2015 | Kim et al. | |
| 8,991,382 B1 | 3/2015 | Mau | |
| D743,131 S | 11/2015 | Jeon et al. | |
| D753,357 S | 4/2016 | Song et al. | |
| 9,328,928 B2 | 5/2016 | Wehr | |
| 9,844,300 B2 | 12/2017 | Cedar et al. | |
| D813,581 S | 3/2018 | Denby et al. | |
| 10,098,502 B2 | 10/2018 | Ohler et al. | |
| 10,125,995 B2 | 11/2018 | Kohli | |
| 10,222,092 B1 | 3/2019 | Traeger | |
| D858,729 S | 9/2019 | Scott | |
| D878,690 S | 3/2020 | Fitzgerald et al. | |
| 10,743,712 B2 | 8/2020 | Skillman | |
| D914,858 S | 3/2021 | Jan | |
| D923,163 S | 6/2021 | Jan | |
| 11,092,342 B2 | 8/2021 | Harrington et al. | |
| 11,293,642 B2 * | 4/2022 | Jan | F24B 1/195 |
| 11,692,713 B2 * | 7/2023 | Jan | F24B 1/181 126/30 |
| 11,703,227 B2 * | 7/2023 | Jan | F24B 1/19 126/30 |
| 2006/0219233 A1 | 10/2006 | Sorenson et al. | |
| 2006/0225724 A1 * | 10/2006 | Turner | F24B 1/00 126/39 B |
| 2007/0039603 A1 | 2/2007 | Lindsly et al. | |
| 2007/0137634 A1 | 6/2007 | Traeger et al. | |
| 2009/0165772 A1 | 7/2009 | Hunt et al. | |
| 2010/0043775 A1 | 2/2010 | Phillips et al. | |
| 2011/0180527 A1 | 7/2011 | Abbott | |
| 2012/0017884 A1 | 1/2012 | Van Den Hoff et al. | |
| 2012/0145139 A1 | 6/2012 | Deeds | |
| 2012/0222668 A1 | 9/2012 | Unger | |
| 2014/0007778 A1 | 1/2014 | Marks et al. | |
| 2014/0026765 A1 | 1/2014 | Fou et al. | |
| 2014/0165993 A1 | 6/2014 | Ahmed | |
| 2014/0238378 A1 * | 8/2014 | Scott | F24B 1/181 126/55 |
| 2015/0068512 A1 | 3/2015 | Mehler et al. | |
| 2015/0110939 A1 | 4/2015 | Benson et al. | |
| 2015/0211743 A1 | 7/2015 | DeFoort et al. | |
| 2016/0245529 A1 * | 8/2016 | McClean | F24B 1/022 |
| 2017/0205068 A1 * | 7/2017 | Anderson | F23L 3/00 |
| 2017/0363325 A1 | 12/2017 | Diurlin et al. | |
| 2019/0313851 A1 | 10/2019 | Shemp | |
| 2020/0049344 A1 | 2/2020 | Masterson | |
| 2020/0224879 A1 | 7/2020 | Scott | |
| 2020/0309369 A1 | 10/2020 | Jan et al. | |
| 2021/0018180 A1 | 1/2021 | Jan et al. | |
| 2021/0048188 A1 | 2/2021 | Harrington et al. | |
| 2021/0199301 A1 | 7/2021 | Poggi et al. | |
| 2021/0274970 A1 | 9/2021 | Stoltzfus | |
| 2021/0282592 A1 | 9/2021 | Jan et al. | |
| 2022/0186931 A1 | 6/2022 | Jan et al. | |

FOREIGN PATENT DOCUMENTS

| | | |
|---|---|---|
| CN | 203052724 U | 7/2013 |
| CN | 302540626 S | 8/2013 |
| CN | 103528100 A | 1/2014 |
| CN | 303111901 S | 2/2015 |
| CN | 204388128 U | 6/2015 |
| CN | 304882431 S | 11/2018 |
| CN | 305060945 S | 3/2019 |
| DE | 202013002524 U | 6/2013 |
| GB | 4019113 | 3/2011 |
| JP | H-10-323289 A | 12/1998 |
| JP | 2000-342462 A | 12/2000 |
| JP | 2003-190011 A | 7/2003 |
| KR | 20-0295935 B1 | 11/2002 |
| KR | 10-0898493 B1 | 5/2009 |

(56) References Cited

FOREIGN PATENT DOCUMENTS

| KR | 1020200122766 A | 10/2020 |
|---|---|---|
| WO | WO-2017078762 A1 | 5/2017 |
| WO | WO2018160767 A | 9/2018 |

OTHER PUBLICATIONS

Amazon.com: Hi Flame 20.5inch Bonfire Fire Pit Smokeless Stainless Steel Outdoor Firepit Backyard Natural Wood Burning Firebowl No. Gas or Propane Required (Large); retrieved online on Dec. 16, 2022; 9 pages.
Amazon.com: thermomate Large Outdoor Fire Pit, 17x16.5 Inch Stainless Steel Round Firepit Bowl Wood Burning, Smokeless Fire Pit for Outside Patio Backyard, Portable Camping Fire Pit; retrieved online on Dec. 16, 2022; 10 pages.
Perforated Tart Ring, announced May 1, 2014[online], [site visited Apr. 9, 2020]. Available from internet, URL:<https://www.amazon.com/PERFORATED-Round-Stainless-0-75-Inch-3-Inch/dp/B00B8KMBO4> (Year: 2014).
Precision Wide Width Perforated Circles Steel Mens Ring, reviewed Oct. 30, 2018[online], [site visited Apr. 9, 2020]. Available from internet, URL:<https://www.tribalhollywood.com/products/mens-ring-stainless-steel-perforated-circles-wide-width-bico-australia-precision-ar6?variant=36286560067> (Year: 2018).
Bonfire Stand, reviewed Aug. 16, 2018[online], [site visited Apr. 9, 2020]. Available from internet, URL:<https://www.homedepot.com/p/Solo-Stove-Bonfire-Stand-BON-STAND/309224139> (Year: 2018).
International Search Authority, International Search Report and Written Opinion, ISA/KR, PCT/US2019/063180, Mar. 26, 2020, 10 pages.
International Search Authority, International Search Report and Written Opinion, for PCT/US2021/020687, mailed Aug. 5, 2021, 11 pages.
Solo Stove, webpage capture: https://www.solostove.com/solo-stove-bonfire, 2017, 8 pages.
Screen captures from YouTube video clip entitled "Solo Stove Bonfire: Best Gear of 2017," 4 pages, uploaded on May 14, 2017 by user "Canadian Prepper". Retrieved from Internet: https://www.youtube.com/watch?v=Vo_J_flWq5g.
Camping stove, https://www.kickstarter.com/projects/340672218/solo-stove-campfire-backpack-camp-survive/description, 21 pages (2014).
Korean Intellectual Property Office, International Search Report and Written Opinion, PCT/US2022/011365, May 3, 2022, 12 pages.
International Search Authority, International Search Report and Written Opinion, for PCT/US2019/067850, mailed Mar. 12, 2020, 4 pages.
Extended European Search Report for corresponding European Patent Application No. 19904751, dated Jul. 27, 2022, 8 pages.
Monty Scott: "Pellet Fire Pit," Published Oct. 5, 2016, XP55943712, Retrieved from the Internet, URL:https://www.youtube.com/watch?v=bB-UJGoMahA, retrieved Jul. 18, 2022, 2 pages.
Examination Report issued from the European Patent Office for related European Patent Application No. 19904751.5, dated Sep. 6, 2023, 6 pages.
Office Action and English translation for related Chinese Patent Application No. 201980077677.6, dated May 17, 2024, 18 pages.

* cited by examiner

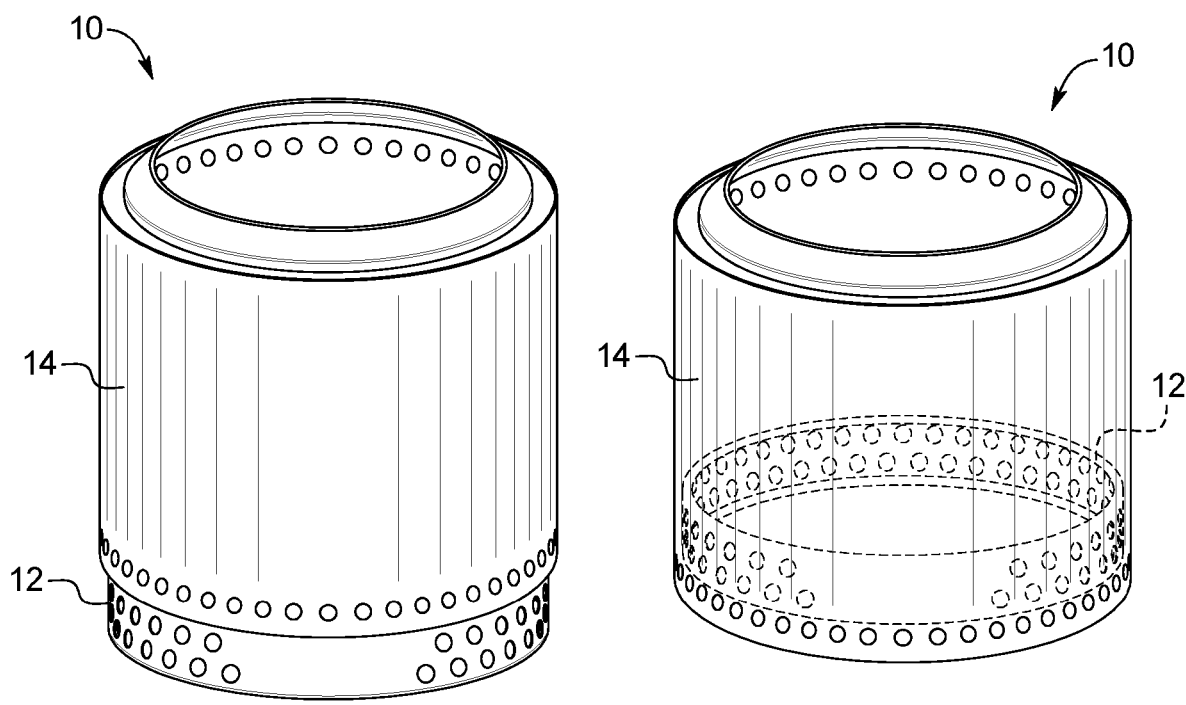
FIG. 1A  FIG. 1B
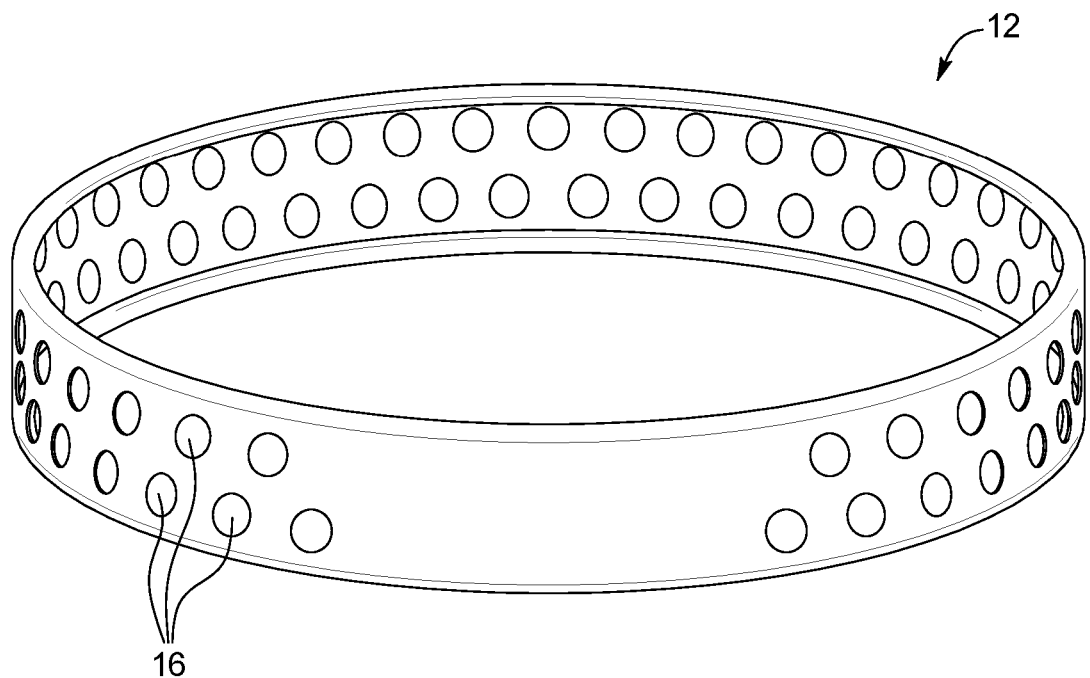
FIG. 2

FIRE PIT SYSTEM

CROSS-REFERENCE TO RELATED APPLICATIONS

This application is a continuation of U.S. patent application Ser. No. 18/325,627, filed May 30, 2023, which is a continuation of U.S. patent application Ser. No. 17/936,928, filed Sep. 30, 2022, now issued as U.S. Pat. No. 11,703,227, which is a continuation of U.S. patent application Ser. No. 17/684,912, filed Mar. 2, 2022, now issued as U.S. Pat. No. 11,692,713, which is a continuation of U.S. patent application Ser. No. 16/722,663, filed Dec. 20, 2019, now issued as U.S. Pat. No. 11,293,642, which claims the benefit of the filing date of, and priority to, U.S. Patent Application No. 62/784,961, filed Dec. 26, 2018, the entire disclosures of which are hereby incorporated herein by reference.

BACKGROUND OF THE INVENTION

The present subject matter relates generally to fire pits. More specifically, the present subject matter provides compact, light, wood burning, natural convection, inverted downgas gasifier fire pits.

The problem with the existing compact wood burning fire pits is that they are built with a process that results in a weak construction of the fire pit, they are inefficient in burning fuel, they require multi-step assembly, and they burn the ground where they are used.

Other current compact wood burning fire pits are made with outdated manufacturing processes that involve repeated spot welding, which decreases the strength of the fire pit and compromises the structural quality of the fire pit. Other compact wood burning fire pits burn their fuel with a traditional campfire method, which is inefficient. Some existing fire pits have an open bottom, which leaves the ground below the fire pit burned and increases the risk of starting a wildfire.

Accordingly, the world needs a compact wood burning fire pit that is strong, durable, easy to use, burns wood more efficiently, requires minimal assembly and leaves minimal impact to the earth after use. There is a need for fire pits as described herein.

BRIEF SUMMARY OF THE INVENTION

To meet the needs described above and others, the present disclosure provides fire pits that are strong, durable, easy to use, burn wood more efficiently, requires minimal assembly and leaves minimal impact to the earth after use.

The fire pit provided herein provides an ultra-light weight, yet strong and sturdy, fire pit that may be taken into the outdoors and will leave no trace on the environment. The fire pit can boil water or cook food with a minimal amount of fuel due to its highly efficient fuel burning process.

The disclosure is also directed to a fire pit stand including a body including a plurality of openings, wherein the walls of the fire pit body can rest upon the fire pit stand. The fire pit stand protects below surfaces (e.g., floor, ground, etc.) from high heat. The openings in the fire pit stand increase airflow. The fire pit stand fits inside the fire pit body creating a portable unit. When the fire pit is being assembled, the fire pit stand can be removed from inside the fire pit body, placed on the ground, and the fire pit body can be placed on top of the fire pit stand.

An object of the invention is to provide a fire pit that is light-weight, compact, and portable. compact, light, wood-burning, natural convection, inverted downgas gasifier fire pits.

Another object of the invention is to provide a wood-burning fire pit that uses natural convection.

Another advantage of the invention is to provide a fire pit that is efficient.

A further advantage of the invention is to provide a fire pit that has minimal impact on the environment in which it is used.

Additional objects, advantages and novel features of the examples will be set forth in part in the description which follows, and in part will become apparent to those skilled in the art upon examination of the following description and the accompanying drawings or may be learned by production or operation of the examples. The objects and advantages of the concepts may be realized and attained by means of the methodologies, instrumentalities and combinations particularly pointed out in the appended claims.

BRIEF DESCRIPTION OF THE DRAWINGS

The drawing figures depict one or more implementations in accord with the present concepts, by way of example only, not by way of limitations. In the figures, like reference numerals refer to the same or similar elements.

FIGS. 1A-1B are perspective views of the stove system in a use configuration and portable configuration, respectively.

FIG. 2 is a perspective view of an example of the fire pit stand.

DETAILED DESCRIPTION

Figure 3A:
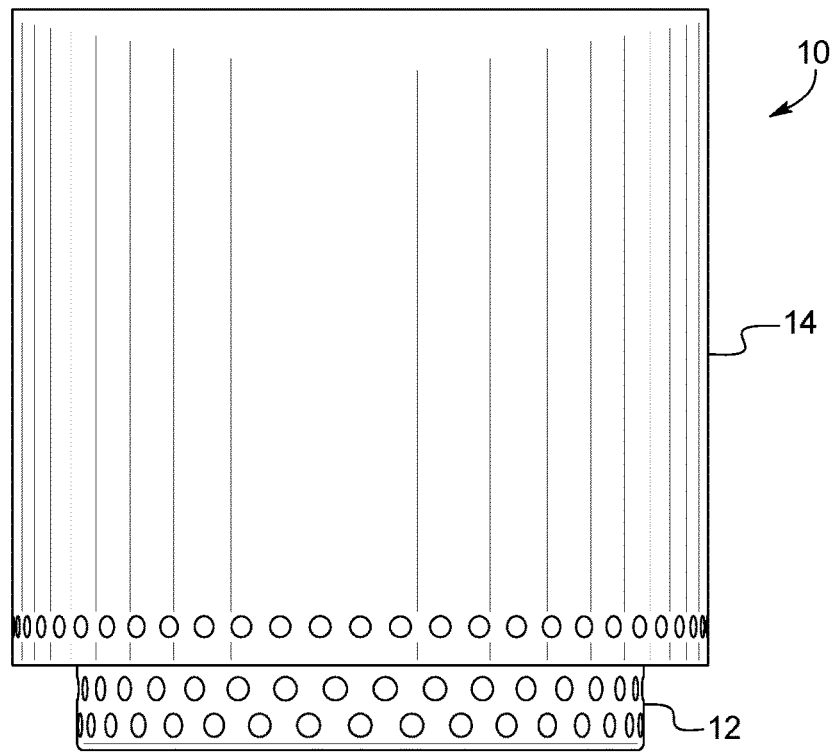
FIGS. 3A-3B are front views of an example of assembling the stove system into the use configuration.

FIGS. 1A-1B illustrate the fire pit system 10 including a fire pit stand 12 used in combination with the fire pit body 14, wherein the fire pit body 14 sits on top of the fire pit stand 12 when the fire pit system 10 is in use. When the fire pit system 10 is not in use, the fire pit stand 12 can be stored within the fire pit body 14. The fire pit body 14 and the fire pit stand 12 can independently be made of a solid metallic band or ring. In an example, the fire pit system 10 can be composed of durable stainless steel.

In an example, the fire pit body 14 can include a plurality of body openings 18 used to increase air flow. For example, the body openings 18 can be arranged in at least one row around the circumference of the fire pit body 14, which allows the outside air to flow into the fire pit to maintain the fire. The air can flow up the walls of the fire pit to be heated and help fuel the secondary combustion. In an example, the row of body openings 18 can be positioned around a bottom portion of the fire pit body 14. For example, the row of body openings 18 can be positioned around a bottom edge of the fire pit body 14. In an example, the body openings 18 can have a diameter of between, and including, 0.2 to 1.0 inches (e.g., 0.51 inches).

The fire pit body 14 can be one piece, which gives the fire pit much greater strength and resistance from bending. The bottom of the fire pit body 14 can include a strength rib that is positioned around the circumference of the bottom, which can create added strength to the fire pit to prevent warping.

The fire pit stand 12 size can be any suitable size. In an example, the diameter of the fire pit stand 12 can be between, and including, 13 inches to 27 inches, or any suitable size to fit the fire pit body 14. The fire pit body 14 can have a diameter between and including 13 inches to 32 inches. The fire pit body 14 can have a diameter slightly larger than that of the fire pit stand 12 such that the fire pit stand 12 can be stored inside the fire pit body 14. In an example, the fire pit stand 12 can be stored within the fire pit body 14 via a pressure fit. Alternatively, or in addition to, the fire pit stand 12 can be stored within the fire pit body 14 via any appropriate mechanism including, but not limited to, clasp, screw, magnet, adhesive, among others.

Figure 3B:
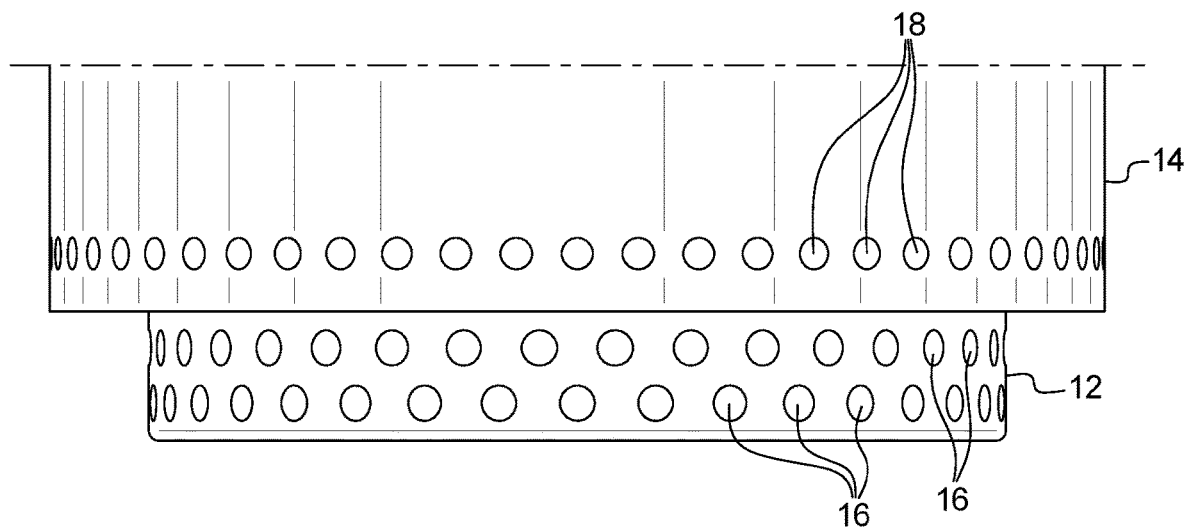

FIG. 3A illustrates an example of how the fire pit system 10 can be assembled by placing the fire pit body 14 on the fire pit stand 12 for use. FIG. 3B illustrates an example of how the fire pit body 14 engages with the fire pit stand 12 when in use. In an example, the fire pit body 14 sits on top of the fire pit stand 12. In an example, the fire pit body 14 stays in place on the fire pit stand 12 using gravity. In other examples, the fire pit body 14 and fire pit stand 12 can engage in a threaded manner or by any other suitable connection, for example, by using clips, clasps, screws, hinges, clamps, latches, among others.

Figure 4:
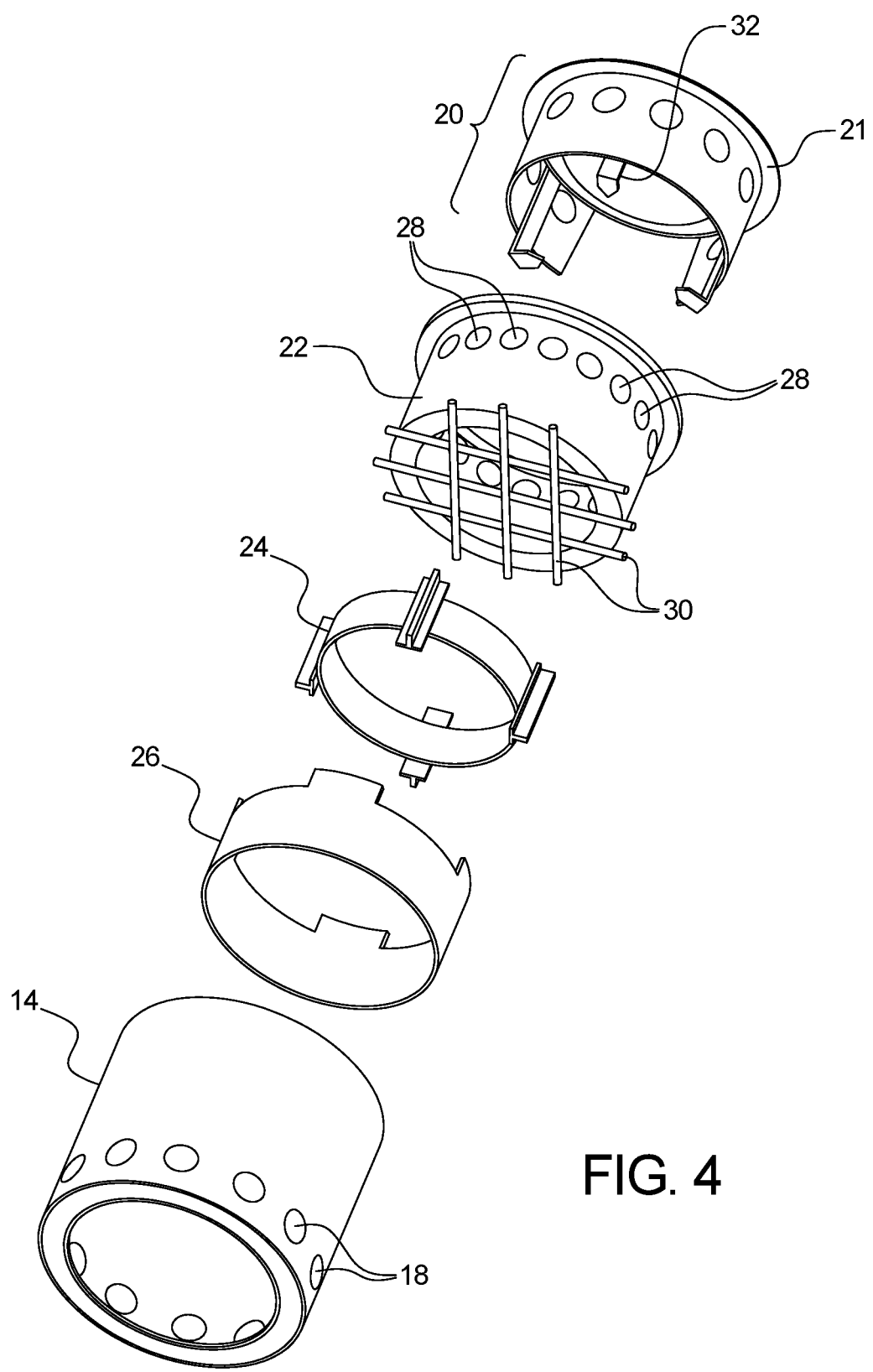
FIG. 4 is another example of the stove system.

FIG. 4 illustrate an example wherein the fire pit stand 12 is angled or curved. For example, the top circumference of the fire pit stand 12 can be greater than the bottom circumference, creating an angled or curved fire pit stand. The fire pit stand 12 can include a at least one row of stand openings 16. The stand openings 16 can be linearly aligned around the circumference of the fire pit stand 12. In an example, the stand openings 16 can have a diameter of between, and including, 0.2 to 1.0 inches (e.g., 0.7 inches).

The disclosure provides a fire pit system 10 that can be designed with a double wall, wherein the fire pit system 10 is a natural convection inverted downgas gasifier fire pit. The air intake holes near the bottom of the fire pit system 10 (e.g., stand openings 16 and/or body openings 18) channel air to the bottom of the fire. At the same time, the air intake holes (e.g., stand openings 16 and/or body openings 18) near the bottom of the fire pit channel warm air up between the walls of the fire pit. The burst of preheated oxygen feeding back into the firebox through the smaller holes near the top of the fire pit causes a secondary combustion. The secondary combustion allows the fire to burn more complete, which is why there is very little smoke during full burn. A more efficient burn also means you will use much less wood compared to an open camp fire. The fire pit does not just burn wood, it actually cooks the smoke out of the wood and then burns the smoke not once, but twice.

The fire pit system 10 can feature a heat shield 26 between an ash pan 24 and a bottom of the fire pit stand 12. The heat shield 26 can protect the ground under the fire pit system 10 from scorching In an example, the system 10 can include a cooking ring 20 that includes an angled lip 21 that increases efficiency by directing heat towards the pot on the cooking ring, which minimizes heat loss. The cooking ring 20 can act as a windshield while allowing oxygen to flow inward, further increasing the fire pit's efficiency.

The cooking ring 20 can nest inside of the fire pit body 14. For example, the cooking ring can be turned right side up and sit on an element to hold a pot or pan in place for cooking. The cooking ring 20 can have three L-shaped legs 32 to keep the pot or pan in place and elevated while cooking. The cooking ring 20 can have an opening to allow the user to feed additional fuel into the fire pit while it is burning.

The fire pit system 10 can include an interior wall 22 positioned inside the fire pit body 14. The interior wall can include a plurality of interior wall holes toward the top of the interior wall 22 that allows the heated air to flow out the top of the fire pit system 10 and out the interior wall holes 28 where the secondary combustion takes place, creating jets of fire from each hole. In an example, the interior wall holes 28 can have a diameter of between, and including, 0.1 to 0.8 inches (e.g., 0.38 inches). A wire grate 30 can be located at the bottom of the fire pit system 10 that holds the fuel from touching the ashpan 24 and allows in the necessary airflow to keep the fuel burning. The grate 30 can be made from nichrome wire, which has an extremely high melting point. The cooking ring can sit atop a lip of the fire pit body 14.

An ashpan 24 can be used to gather all the ash and debris that falls through from the wire grate 30 while the fire pit system 10 is burning. In an example, the ashpan 24 can be built into the fire pit body 14 and/or fire pit stand 12, where the ashpan 24 does not move. Simply turning the ashpan 24 upside down and dumping it out can dispose of ash and debris, once the fire pit system 10 and debris have cooled.

The system 10 can include a heat shield 26, the purpose of which is to prevent the bottom of the fire pit from overheating and burning the ground. The heat shield 26 can deflect the heat upward, keeping the bottom of the fire pit cooler and preventing the ground from being scorched. The heat shield 26 can be built into the fire pit body 14 and can be located below the ashpan 24.

In an example, the fire pit system 10 can be made using a one-piece construction process. The manufacturing process can allow the use of state-of-the-art precision presses to form and shape solid pieces of high-grade stainless steel. The fire pit body 14 and/or fire pit stand 12 of the fire pit system 10 can be one piece of stainless steel with no seams or welds. The fire pit body 14 and the floating ashpan 24 can be made using one-piece construction, which eliminates the need for excessive welding and increases the overall strength and lifespan of the fire pit system 10. Nichrome wire, which has a high melting point of 2552 degrees Fahrenheit, can be used for the grate 30.

The fire pit system 10 can be assembled by placing the fire pit system 10 on level ground away from wind. A windscreen can be used to greatly increase the efficiency of the fire pit. For added safety, any flammable ground debris can be removed within a five foot radius of the fire pit system (e.g., twigs, leaves, grass etc.). The nested cooking ring 20 can be removed from inside the fire pit, and inverted with the three pot stands facing up and placing the cooking ring on top of the fire pit. The fire pit stand 12 can be removed from inside the fire pit body 14, placed on the ground, then the fire pit body 14 can be placed on top of the fire pit stand.

The fuel can be prepared by gathering dry twigs and other biofuel of different sizes. The twigs can be broken into finger length pieces and separate them into piles according to their thickness (small, medium, large).

The following are two examples of methods that can be used to start the fire in the fire pit.

Method 1: A fuel-efficient way to cook on the fire pit system 10 is with a full load of fuel that is lit on top. Large sticks and twigs can be placed neatly on top of the nichrome wire grate up until the bottom of the top air vents of the interior wall holes. A small fire can be lit on top using your favorite tinder or fire starter. The fire can be fed with small to medium sized sticks and tinder until the fire is self-sustaining. The fire can continue to be fed until it has spread across the full width of the fire pit and the main fuel load begins to burn from the top down. After the air in the wall of the fire pit heats up, airflow will improve and a secondary combustion will be visible near some or all of the secondary air vents (e.g., interior wall holes). If the initial burn consumes the main fuel load and a flame is needed to continue cooking, additional fuel can be added through the opening in the cooking ring. For example, finger sized twigs can be added and other biofuel to maintain a flame.

Method 2: A tinder or fire starter can be used to light a small fire inside the fire pit and pile on small to medium sized twigs to stoke the fire. As the fire grows, larger sticks and twigs can be added. Larger sticks and twigs can keep the fire burning longer and will decrease the amount of times required for feeding the fire. If too much fuel is added too late, especially with thick or damp sticks, there may be a lot of smoke and the fire may be snuffed. This method of operation, although often easier for beginners, can produce more smoke than Method 1 because the wood gas rises directly to combustion with the secondary air without the cleaning effect of passage through a hot layer of charcoal.

It should be noted that various changes and modifications to the presently preferred embodiments described herein will be apparent to those skilled in the art. Such changes and modifications may be made without departing from the spirit and scope of the present invention and without diminishing its attendant advantages.

What is claimed is:

1. A fire pit system, comprising:
    a fire pit stand including a stand wall having one or more stand openings; and
    a fire pit body adapted to sit atop the fire pit stand, the fire pit body defining a body top end portion and a body bottom end portion, the fire pit body comprising:
        an exterior body wall extending between the body bottom end portion and the body top end portion;
        an interior body wall positioned inside and spaced apart from the exterior body wall to permit an upward flow of air therebetween; and
        one or more inwardly-facing body openings positioned at the body top end portion to permit a flow of air from between the interior body wall and the exterior body wall;
    wherein, when the fire pit body sits atop the fire pit stand, the one or more stand openings are adapted to channel air to a bottom of a fire to fuel primary combustion;
    wherein the fire pit body is removable from atop the fire pit stand;
    wherein the interior body wall defines a first inside diameter;
    wherein the top of the fire pit stand on which the fire pit body is adapted to sit defines a maximum outside diameter that is less than the first inside diameter of the interior body wall;
    wherein the fire pit body further comprises an upper ring at the body top end portion, the upper ring defining a second inside diameter;
    wherein the second inside diameter of the upper ring is less than the first inside diameter of the interior body wall;
    wherein the one or more inwardly-facing openings are disposed below the upper ring at the body top end portion;
    wherein the one or more inwardly-facing openings are formed through the interior body wall;
    wherein the stand wall having the one or more stand openings defines a first outside diameter; and
    wherein the exterior body wall defines a second outside diameter at the body bottom end portion that is greater than the first outside diameter of the stand wall having the one or more stand openings.

2. The fire pit system of claim 1, wherein the first inside diameter of the interior body wall is greater than the first outside diameter of the stand wall having the one or more stand openings.

3. The fire pit system of claim 1, wherein the upper ring is removable from atop the body top end portion.

4. The fire pit system of claim 1, wherein the second inside diameter of the upper ring is less than the first outside diameter of the stand wall having the one or more stand openings.

5. The fire pit system of claim 1, wherein the fire pit body further comprises:
    one or more additional body openings positioned at the body bottom end portion of the fire pit body and adapted to channel air up between the interior body wall and the exterior body wall, and through the one or more inwardly-facing body openings, to fuel secondary combustion.

6. The fire pit system of claim 5, wherein the one or more additional body openings are further adapted to channel air to a bottom of a fire to fuel primary combustion.

7. The fire pit system of claim 5, wherein the one or more additional body openings are formed through the exterior body wall.

8. The fire pit system of claim 1,
    wherein:
        when the fire pit body sits atop the fire pit stand, the one or more stand openings are further adapted to channel air up between the interior body wall and the exterior body wall, and through the one or more inwardly-facing body openings, to fuel secondary combustion.

9. A fire pit system, comprising:
    a fire pit stand including a stand wall having one or more stand openings; and
    a fire pit body adapted to sit atop the fire pit stand, the fire pit body defining a body top end portion and a body bottom end portion, the fire pit body comprising:
        an exterior body wall extending between the body bottom end portion and the body top end portion;
        an interior body wall positioned inside and spaced apart from the exterior body wall to permit an upward flow of air therebetween; and
        one or more inwardly-facing body openings positioned at the body top end portion to permit a flow of air from between the interior body wall and the exterior body wall;
    wherein, when the fire pit body sits atop the fire pit stand, the one or more stand openings are adapted to channel air to a bottom of a fire to fuel primary combustion;
    wherein the fire pit body is removable from atop the fire pit stand;
    wherein the interior body wall defines a first inside diameter;
    wherein, when the fire pit body sits atop the fire pit stand, the one or more stand openings are further adapted to channel air up between the interior body wall and the exterior body wall, and through the one or more inwardly-facing body openings, to fuel secondary combustion;
    wherein the fire pit body further comprises an upper ring at the body top end portion, the upper ring defining a second inside diameter;
    wherein the second inside diameter of the upper ring is less than the first inside diameter of the interior body wall;

wherein the one or more inwardly-facing openings are disposed below the upper ring at the body top end portion;
wherein the one or more inwardly-facing openings are formed through the interior body wall;
wherein the stand wall having the one or more stand openings defines a first outside diameter; and
wherein the exterior body wall defines a second outside diameter at the body bottom end portion that is greater than the first outside diameter of the stand wall having the one or more stand openings.

10. A fire pit system, comprising:
a fire pit stand including a stand wall having one or more stand openings; and
a fire pit body adapted to sit atop the fire pit stand, the fire pit body defining a body top end portion and a body bottom end portion, the fire pit body comprising:
an exterior body wall extending between the body bottom end portion and the body top end portion;
an interior body wall positioned inside and spaced apart from the exterior body wall to permit an upward flow of air therebetween; and
one or more inwardly-facing body openings positioned at the body top end portion to permit a flow of air from between the interior body wall and the exterior body wall;
wherein, when the fire pit body sits atop the fire pit stand, the one or more stand openings are adapted to channel air to a bottom of a fire to fuel primary combustion;
wherein the interior body wall defines a first inside diameter; and
wherein the top of the fire pit body on which the fire pit stand is adapted to sit defines a maximum outside diameter that is less than the first inside diameter of the interior body wall.

11. The fire pit system of claim 10, wherein the fire pit body is removable from atop the fire pit stand.

12. The fire pit system of claim 10, wherein the stand wall having the one or more stand openings defines a first outside diameter.

13. The fire pit system of claim 12, wherein the first inside diameter of the interior body wall is greater than the first outside diameter of the stand wall having the one or more stand openings.

14. The fire pit system of claim 12, wherein the fire pit body further comprises an upper ring at the body top end portion, the upper ring defining a second inside diameter; and
wherein the one or more inwardly-facing openings are disposed below the upper ring at the body top end portion.

15. The fire pit system of claim 14, wherein the upper ring is removable from atop the body top end portion.

16. The fire pit system of claim 14, wherein the second inside diameter of the upper ring is less than the first inside diameter of the interior body wall.

17. The fire pit system of claim 14, wherein the second inside diameter of the upper ring is less than the first outside diameter of the stand wall having the one or more stand openings.

18. The fire pit system of claim 14, wherein the exterior body wall defines a second outside diameter that is greater than the first outside diameter of the stand wall having the one or more stand openings.

19. The fire pit system of claim 18, wherein the exterior body wall defines the second outside diameter at the body bottom end portion.

20. The fire pit system of claim 10, wherein the one or more inwardly-facing openings are formed through the interior body wall.

21. The fire pit system of claim 10, wherein the fire pit body further comprises:
one or more additional body openings positioned at the body bottom end portion of the fire pit body and adapted to channel air up between the interior body wall and the exterior body wall, and through the one or more inwardly-facing body openings, to fuel secondary combustion.

22. The fire pit system of claim 21, wherein the one or more additional body openings are further adapted to channel air to a bottom of a fire to fuel primary combustion.

23. The fire pit system of claim 21, wherein the one or more additional body openings are formed through the exterior body wall.

24. The fire pit system of claim 10,
wherein:
when the fire pit body sits atop the fire pit stand, the one or more stand openings are further adapted to channel air up between the interior body wall and the exterior body wall, and through the one or more inwardly-facing body openings, to fuel secondary combustion.

25. A fire pit system, comprising:
a fire pit stand including a stand wall having one or more stand openings; and
a fire pit body adapted to sit atop the fire pit stand, the fire pit body defining a body top end portion and a body bottom end portion, the fire pit body comprising:
an exterior body wall extending between the body bottom end portion and the body top end portion;
an interior body wall positioned inside and spaced apart from the exterior body wall to permit an upward flow of air therebetween; and
one or more inwardly-facing body openings positioned at the body top end portion to permit a flow of air from between the interior body wall and the exterior body wall;
wherein, when the fire pit body sits atop the fire pit stand, the one or more stand openings are adapted to channel air to a bottom of a fire to fuel primary combustion;
wherein the interior body wall defines a first inside diameter; and
wherein, when the fire pit body sits atop the fire pit stand, the one or more stand openings are further adapted to channel air up between the interior body wall and the exterior body wall, and through the one or more inwardly-facing body openings, to fuel secondary combustion
wherein the stand wall having the one or more stand openings defines a first outside diameter; and
wherein the exterior body wall defines a second outside diameter at the body bottom end portion that is greater than the first outside diameter of the stand wall having the one or more stand openings.

26. The fire pit system of claim 25, wherein the fire pit body is removable from atop the fire pit stand.

27. The fire pit system of claim 25, wherein the fire pit body further comprises an upper ring at the body top end portion, the upper ring defining a second inside diameter; and
wherein the second inside diameter of the upper ring is less than the first inside diameter of the interior body wall.

28. The fire pit system of claim 27, wherein the one or more inwardly-facing openings are disposed below the upper ring at the body top end portion.

29. The fire pi system of claim 25, wherein the one or more inwardly-facing openings are formed through the interior body wall.

\* \* \* \* \*